United States Patent [19]
Browne

[11] 4,043,690
[45] Aug. 23, 1977

[54] WIRE ROPE TERMINATION

[75] Inventor: William R. K. Browne, York, Maine

[73] Assignee: York Engineering, Inc., York Harbor, Maine

[21] Appl. No.: 654,036

[22] Filed: Feb. 2, 1976

Related U.S. Application Data

[63] Continuation of Ser. No. 608,709, Aug. 28, 1975, abandoned.

[51] Int. Cl.² .................................................. B25G 3/34
[52] U.S. Cl. .................................... 403/268; 403/269; 29/460; 29/461
[58] Field of Search ............... 403/268, 267, 265, 266, 403/269, 270; 264/263, 271, 272; 29/460, 461

[56] References Cited

U.S. PATENT DOCUMENTS

| | | | |
|---|---|---|---|
| 2,389,951 | 11/1945 | Brickman | 29/461 X |
| 2,484,485 | 10/1949 | Brickman | 29/461 X |
| 2,652,231 | 9/1953 | Smith | 403/268 |
| 3,422,592 | 1/1969 | Gjerde | 403/267 X |
| 3,570,074 | 3/1971 | Schimmeyer et al. | 403/267 |
| 3,573,346 | 4/1971 | Appleby | 403/267 X |
| 3,858,992 | 1/1975 | Eucker | 29/461 X |

FOREIGN PATENT DOCUMENTS

| | | | |
|---|---|---|---|
| 724,344 | 12/1965 | Canada | 403/267 |
| 1,364,098 | 11/1964 | France | 403/268 |
| 308,381 | 3/1929 | United Kingdom | 403/267 |

Primary Examiner—Wayne L. Shedd
Attorney, Agent, or Firm—Cesari and McKenna

[57] ABSTRACT

In a cable termination, preformed cable wires are unlaid so that they form an unstressed envelope with a bulge and a flare. The cable end is positioned in a sleeve having a tapered bore that is coextensive with the envelope. Resin that forms an incompressible plug inside the sleeve is forced into the bore by a fitting screwed onto the sleeve at the larger end of the bore.

9 Claims, 5 Drawing Figures

WIRE ROPE TERMINATION

RELATED APPLICATION

This application is a continuation-in-part of my co-pending application, Ser. No. 608,709, filed Aug. 28, 1975, now abandoned.

BACKGROUND OF THE INVENTION

This invention relates to a cable termination. It relates more particularly to method and means for terminating a stranded rope or cable made of wire or other strong material.

Terminals are used at the ends of wire rope and cable to securely connect the cable to an end fitting of some kind. The end fitting may be an eye, a stud, a fork or some other type of link for connecting the rope to an object of a mooring point. Such terminated ropes and cables are widely used in the boating industry, for example, to secure spars and masts. They are also used in a variety or other applications such as to support elevators, move aircraft control flaps, as guy lines, etc.

There are several types of conventional cable terminations. Some terminals are swagged onto the ends of cables. The so-called hot socket terminal in installed on the end of the cable, the cable wires are broomed out and molten zinc is poured into the terminal to form an incompressible plug which retains the cable wires in the terminal. There is also the swageless terminal comprising a split ring engaged over the cable and threaded male and female members which when threaded together clamp the ring against the cable.

All of these conventional terminations have serious drawbacks. The first two types require special tools and equipment in order to secure the terminal to the cable. Therefore, those terminals cannot easily be installed in the field. Rather, the terminated cable must be made to order at the plant. Elevator cables are a particular case in point. These soft core cables are made up of many smaller strands wound together. Each of these strands is, in turn, made up of a multiplicity of still smaller spirally wound wires. Further, the core of the cable consists of a soft lubricating rope. Because of the many wires involved, and the soft core it is quite difficult to anchor the fitting to the cable. Extremely high swagging pressures must be applied to the terminal or the hot socket approach used, both of which can only be done at the factory. This means that elevator cables must be essentially custom-made and brought to the site. If the cable tends to be an inch too long or too short it cannot be used and a new cable must be made up, requiring added time and expense.

The swaged and swageless terminals also can become corroded due to the moisture accumulation in the terminal or due to electrolytic action. This is particularly true if the cable is used in boating or underwater applications where salt water is present. Also in winter, sometimes water inside the terminal freezes to ice, expanding in the process and cracking the terminal. Further in the case of the swaged terminals, the outside cable strands can be damaged during installation by the swagging force applied to the terminal.

Relatively recently there has been developed cable terminals which terminal utilize epoxy resin as the medium for retaining the wires in the terminal. These terminals are advantaged in that they can be installed in the field because the epoxy resin will set without requiring an appreciably applied heat.

This type of terminal is similar to the hot socket terminal in that it comprises a conical sleeve which is engaged over the end of the rope. The end of the rope is then broomed out and epoxy resin is poured into the open end of the socket and surrounds the rope wires. The resin sets up around the wires into a solid wedge-shaped block which tends to retain the rope in the sleeve when tensile stress is applied to the rope. Examples of this type of termination are disclosed in U.S. Pat. Nos. 3,507,949 and 3,468,569.

These prior "cold socket" terminals while sometimes reputed to be able to withstand a tensile stress at least equal to the tensile strength of the rope, do not, in fact, consistently do so. The main reason for this is that when the rope is tensioned, the load is not distributed evenly among the wires inside the terminal sleeve. Consequently some of the wires break or pull out of the resin plug thereby weakening the termination particularly when there are not very many wires in the rope.

The reasons why some wires in the terminal carry more load then others are believed to be three-fold. First, when the end of the rope is broomed out to accept the epoxy resin, this is done without any design so that the wires are not uniformly distributed across the terminal, particularly when the rope is composed of relatively few wires (e.g. 1 × 7, 7 × 7 or 7 × 19 rope). Secondly, when the wires are broomed out in that abrupt fashion, they are deformed from their performed sinuous shape so that individual wires have unnatural crooks and bends which become points of weakness when the rope is under load. Finally, when the resin is poured into the terminal, air bubbles are entrained therein. Consequently when the resin sets, there may be relatively large voids in the resin plug so that the plug does not securely grip all the wires uniformly. The upshot of all this is that the tensile stress rating of these prior end fittings and terminals typified by the ones in the above patents depends primarily on the strength of the mechanical connection or bond between the resin and the rope wires and not on any wedging action between the conical resin plug and sleeve. As often as not, then, when the rope is tensioned, the rope wires out of the terminal before the rope parts.

All of the aforesaid problems plague the terminated stranded wire rope and cable in use today and as a result such terminated cables are quite expensive to make and install and have a relatively short life.

SUMMARY OF INVENTION

Accordingly, this invention aims to provide a terminated stranded wire rope and cable construction which is very strong as compared with conventional terminated cables.

Another object of the invention is to provide a terminal for a stranded wire rope or cable which can be installed quickly in the field without any special tools or equipment.

A further object of the invention is to provide a terminal of this type which is unaffected by the elements or electrolytic action.

Another object is to provide a terminal of this general type which can be applied to cables having a wide range of diameters.

Yet another object of the invention is to provide a terminal for a stranded wire rope or cable which is never too tight or too loose so that the terminal does not damage the cable and does not separate from the cable in use.

A further object of the invention is to provide a cable termination which can withstand a tensile stress at least equal to 100% of the tensile strength of the cable.

Another object of the invention is to provide a cable termination of this type which is relatively inexpensive to make and install.

A further object is to provide an improved method of terminating rods and cables.

Other objects will, in part, be obvious and will, in part, appear hereinafter.

The invention accordingly comprises the features of construction, combination of elements and arrangement of parts and sequence of steps which wll be exemplified in the following detailed description and the scope of the invention will be indicated in the claims.

Briefly, the present terminal includes a sleeve having a wedge-shaped or necked-down bore, the larger end of which is internally threaded. The sleeve is slid small end first onto the end of the wire rope which is to be terminated until the rope projects from the opposite end of the sleeve.

Conventional wire rope usually comprises an inner group of wires and an outer group of wires. There may, for example, be seven wires in each group (i.e. 7 × 7 rope) or one in the inner group and seven in the outer one (i.e. 1 × 7 rope).

The wires (if more than one) in each group are preformed with a helical twist so that when the wires in each group are laid about the axis of the rope, they nest against one another in a tightly packed condition. Usually the inner group of wires are twisted in one direction and the outer group are twisted in the opposite direction for maximum rope strength.

The present termination technique is designed to take advantage of the natural characteristics of such standard wire rope. Thus upon being slid into the sleeve, the outer group of wires at the end of the rope are carefully unlaid approximately one and one-half lays (corresponding to a three-quarter twist). Whereupon each wire segment assumes its preformed loose helical twist and together, the unlaid wire segments distribute themselves uniformly about the axis of the rope (and the inner group of wires). In fact, they form an outline resembling that of a "Coke bottle". In other words, the outline has a bulge where the unlaid segments join the rope, then, proceeding towards the end of the rope, the outline has a reduced diameter "waist" and then it flares out.

The terminal sleeve is designed so that the diameter-to-length ratio of its bore is such that when the rope is unlaid as aforesaid and the rope is pulled back through the sleeve until the ends of the wires lie adjacent the innermost thread in the bore, the flaring wire ends will lie against and be distributed evenly around the bore wall. Also the point where the unlaid wire segments join the rope will be located just inside the small end of the sleeve bore. This arrangement automatically centers the unlaid rope wires in the sleeve bore and preserves the natural configuration and distribution of those wires.

Next, after the wires are suitably cleaned and those in the inner group are broomed out, a quick-acting liquid epoxy resin or other comparable material is poured into the open end of the sleeve substantially filling its bore. Finally the fitting which is to be attached to the rope is secured to the sleeve. In this, the fitting which may be a stud, a yoke, an eye, etc., includes a threaded extension which is screwed down into the threaded end of the sleeve bore. In the process, the screw extension pumps and forces the liquid resin into the spaces between the unlaid cable strands. Moreover this pump action eliminates any large air bubbles from the resin body. As a result, the resin substantially surrounds each individual strand segment in the bore all along its length.

Upon application of moderate heat from a convenient source such as a match, a torch, or even sunlight, the resin sets in minutes to form a solid compressible wedge-shaped plug or block inside the sleeve.

When a tensile load is applied to the rope, this is communicated to the wires inside the terminal sleeve. Because of the natural configuration and distriution of the wires within the sleeve, and the absence of large voids in the resin, the wires share that load equally. As the load is increased, the wires are thus able to grip the resin plug sufficiently to shift it axially in the sleeve bore so that the plug becomes compressed whereupon the plug now grips the wires evermore tightly. Thus under the heavy loads for which the terminal is rated, the terminal does not rely on any mechanical bond between the resin and wires. Rather the wires are retained in their natural shape in the plug by compressive engagement of the plug. As a result, the termination will withstand a tensile stress at least equal to the tensile strength of the rope.

This same type of termination can be applied to rope of almost any diameter in use today. However, for very large diameters, e.g. three inches or more, it may be desirable to use two such terminals in tandem, one for the inner group of rope wires and one for the outer group as will be described in detail later.

Also if the rope is composed of a very large number of very small diameter wires which provide a great amount of total surface area and distribution then it may suffice to broom out the wires without carefully unlaying them as described above prior to applying the resin.

Another advantage of the present construction arises because the resin plug completely fills and seals the sleeve. Therefore each wire therein is separately insulated and no moisture can enter the terminal and possibly cause corrosion or expansion damage to the terminal.

Further since no pressure is applied to the sleeve to secure it to the cable, the terminal can be made of almost any suitable material including titanium and plastic which normally crack under swaging pressures.

Those same attributes allow the terminal to be used in marine and oceanographic applications where it is desired to run electrical leads through the core of the cable to underwater equipment. Installation of the terminal does not damage those leads and the resin plug isolates the leads from the water.

It is important to note also that the installation of the terminal on the cable requires no special tools; consequently the entire procedure can be done in the field so that each terminated cable can be made up on the job- with assurance that it will be exactly the correct length for the given application. Yet with all of these advantages, the terminal is quite inexpensive to make and install. In fact, it is less expensive than any of the cable terminations presently in use. Therefore, the terminal should find wide application wherever stranded wire rope or cable is used.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENTS

Figure 1:
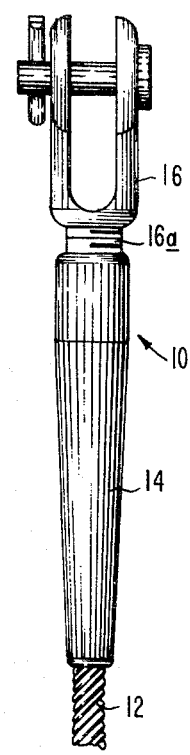
FIG. 1 is a fragmentary perspective view of a cable termination embodying the principles of this invention.

Referring to FIG. 1 of the drawing, a cable terminal indicated generally at 10 is attached to a conventional stranded wire rope or cable 12. The terminal includes a generally cylindrical sleeve 14 and an end fitting 16. The illustrated fitting is a standard fork. However the fitting could just as well be an eye, a stud or other type of link depending upon how the cable is to be used.

Figure 2:
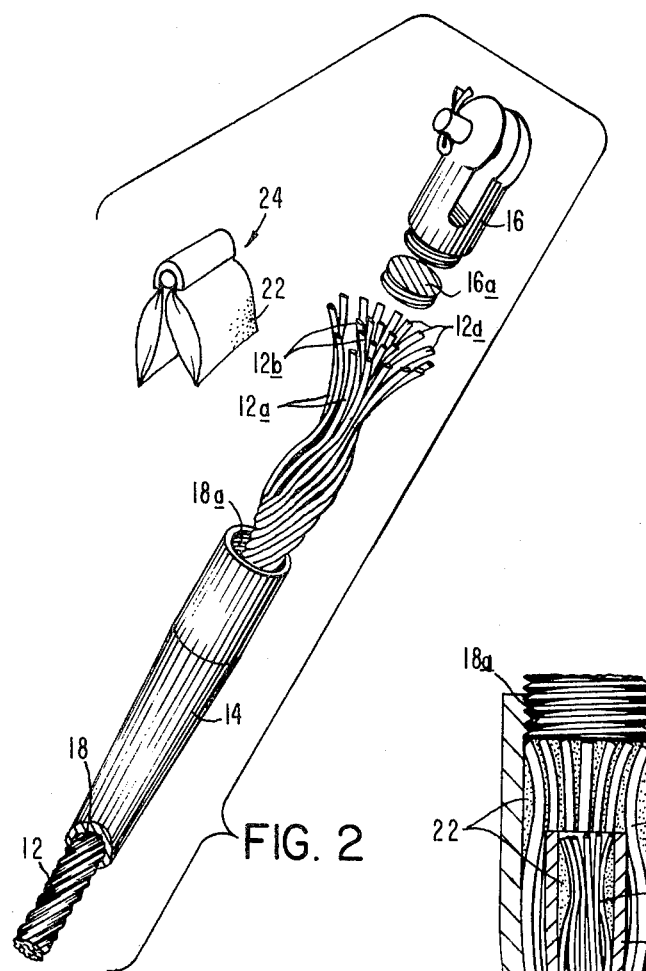
FIG. 2 is an exploded perspective view showing the elements of the cable terminal in greater detail.
Figure 3:
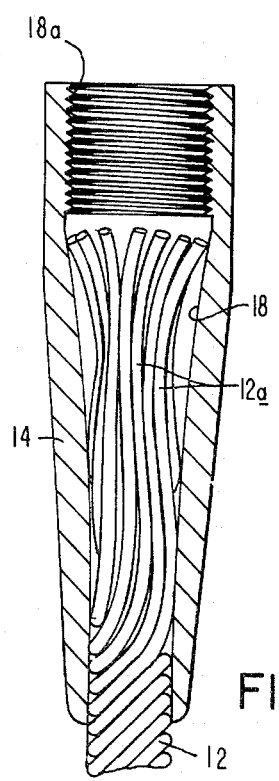
FIG. 3 is a side elevation with parts in section on a larger scale showing the lay of the rope wires in the terminal.
Figure 4:
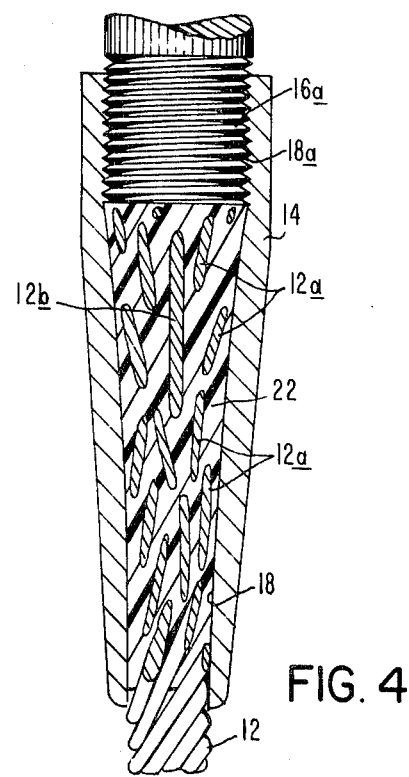
FIG. 4 is a fragmentary sectional view of the cable termination on the same scale further illustrating the invention.

End fitting 16 includes a threaded screw extension 16a which is turned down into the threaded end 18a of a wedge-shaped or necked-down bore 18 in sleeve 14 as best seen in FIGS. 2 to 4.

Typically the rope or cable 12 is made of steel and sleeve 14 and fitting 16 are made of brass of stainless steel. However it will be appreciated that those parts can be made of almost any other strong, rigid material. Sleeve 14 is easily made by swaging a length of cylindrical tubing. Also it should be understood at this point that the size and shape of the sleeve and fitting may be varied depending upon the given application.

Referring now to FIG. 2, to install the terminal 10 on cable 12, first the end of cable 12 is inserted into the smaller end of bore 18 and threaded through the bore until its end projects from the threaded end 18a of the bore. Then the end of the cable or more particularly the outer group of wires 12a comprising the cable are unlaid so that they assume their natural preformed helically twisted shape. In a typical case, the cable is untwisted approximately one-quarter turn which corresponds to one and one-half lays of wires 12a. This suffices to cause the wires to arrange themselves in an outline similar to that of a Coke bottle in which there is a bulge adjacent to the point where the wires join the unlaid cable, then a constriction and then the wires flare out at an angle of approximately 10° relative to the cable axis. The inner group of wires 12b comprising the cable, if there is more than one such wire, may be similarly untwisted, but in the opposite direction. However, in most cases, it is sufficient simply to broom out the ends of those wires as shown in FIG. 2.

Turning now to FIG. 3, the length of bore 18 and its greater and lesser diameters are selected so that when the cable is unlaid in the aforesaid fashion and the rope is pulled back into the sleeve as shown in FIG. 3, the ends of the wires will be distributed around the wall of the bore just below the threads and the point at which the separated wires join the twisted cable will lie just inside the lower end of the sleeve. This results in the group of wires 12a being coaxial with the axis of the bore 18 wall and with the ends of the wires being distributed uniformly around the bore wall thereby defining spaces within the bore both inside and outside the Coke bottle shape defined by the wires. Furthermore each wire 12a remains set in its performed helical twist so that there are no unnatural bends or kinks created in the wires.

After the cable wires are properly seated within the sleeve as shown in FIG. 3, a suitable quick-acting liquid epoxy resin 22 conveniently contained in a plastic packet 24 (FIG. 2) is poured into bore 18 until the bore is substantially filled with resin. Preferably, the cable will have been degreased with gasoline, lighter fluid, kerosene or other appropriate solvent prior to being seated in the sleeve. Then the threaded screw extension 16a of fitting 16 is screwed down into the bore end 18a as shown in FIG. 4.

As the extension is turned down into the bore, it pumps and forces liquid resin in between the individual cable wires 12a and 12b so that each wire is substantially surrounded by resin. This pumping action also eliminates any large air bubbles entrained in the resin as it is poured into the bore and also distributed small air bubbles uniformly throughout the resin body. Accordingly, each wire segment within the bore is substantially completely surrounded by resin throughout its entire length.

Actually during this pumping procedure, the liquid resin can be observed oozing out between the cable strands 12a projecting from the lower end of sleeve 14. When resin oozes out all around the cable, that indicates that the resin has completely filled the chamber and that all large air bubbles have been eliminated.

The resin 22 sets at room temperature in an hour or two. If faster setting is desired, any indirect form of heat such as from sunlight, a heated automobile or boat engine, etc. will accelerate the setting process so that the cable can be used in ten or fifteen minutes. If immediate use is required, the terminal 10 can be heated directly by a conventional torch, cigarette lighter or the like in which case the resin will set in a few minutes. In any event, when the resin 22 does set, it forms a solid, wedge-shaped plug inside sleeve 14 that completely fills bore 18.

The liquid resin also will have oozed up into the helical spaces between the threaded fitting 16a and threaded bore 18a so that when the resin there sets, it locks the two threaded elements together so that there is little tendency for the fitting to become unscrewed form the sleeve in use.

A sleeve 14, fitting 16 and resin packet 24 can be packaged together conveniently as a kit, with suitable directions D being provided in the kit on the surface of packet 24 or elsewhere instructing the user how to apply a sleeve to a cable and pump the resin into the sleeve using the fitting.

As best seen in FIG. 4, the solidified resin surrounds and grips each individual helically twisted wire 12a within the sleeve. Consequently, each wire functions more or less as a screw which resists being pulled directly from the resin plug. Also, the resin plug exists both inside and outside the Coke bottle shape defined by wires 12a and 12b. This factor also reduces any tendency of the wires to be pulled directly from the resin plug. Still further, the broomed out wires 12b in the inner group comprising the cable add further resistance to the cable becoming separated from the resin plug. The result is that when a tensile force is applied to the cable there is enough mechanical "grab" between the wires and the plug such that wires are not pulled away from the plug until the plug is shifted axially within the sleeve.

As soon as the wedge-shaped resin plug is shifted or drawn down into the wedge-shaped bore 18, compressive forces take over. More particularly the resin plug is squeezed uniformly radially towards its axis into evermore intimate engagement with the individual wires 12a and 12b with those forces being distributed substantially uniformly all around the individual wire segments. Thus the same compressive force is applied all around each individual wire 12a and against the inner group of wires 12b. No single wire or group of wires is subjected to any substantially greater stress than the others.

Furthermore, this ever increasing compression against the wires maintains the wires in their natural preformed shapes so that even under extremely heavy tensile loads, the wires are not distorted so that bends or kinks develop therein that could constitute points of weakness, even in the region adjacent the bottom of sleeve 14. Also as noted previously, due to the mode of pumping the adhesive into the bore, there are no voids in the resin plug that could cause unequal loading on the wires.

While almost any liquid resin may be employed, a particularly suitable one using a catalyst is sold as CY-5 epoxy resin by Epoxy Technology Co., Watertown, Massachusetts. When that resin solidifies, it forms a solid plug having an excellent compressive strength inside the sleeve hereby producing a termination which is at least as strong as the cable itself. In other words, if a load is applied to cable 12, the cable will break before the terminal 10 will separate from the cable. In an actual test of one-half inch stainless steel terminal, cable 12 broke under a load of 25,000 pounds, while the terminal itself remained entirely undisturbed.

Another suitable material that may be used to form the plug inside sleeve 14 is a high alumina content cement which may also be filled with a suitable filler comprising metal filings, lead shot, etc. This material sets quickly, is relatively inexpensive and is compatible with the metals involved and has good compressive strength.

Of course, the fitting 16 can be changed if desired after the resin has set simply by forceably unscrewing it from the sleeve bore 18a and replacing it with a different type of fitting.

The present terminal is also suitable for use in terminating stranded rope of cable in which each of the wires 12a and 12b is actuatlly a strand comprising several smaller wires. When this type of cable is being terminated, it is desirable to unlay the cable as described above with the outer group of multiwire strands forming the Coke bottle shape noted above. Then, for best results the individual wires in each strand in the outer group as well as those in the inner group of strands can be broomed out.

Also when the cable is composed of a very large number of very small diameter wires, e.g. elevator cable, simple brooming out may suffice to provide the required surface area and wire distribution to provide enough grab between the wires and the resin plug to shift the resin plug axially within the bore so that compressive forces take over before the wires pull out of the plug. The wires in this particular type of cable are usually not preformed and have a very small diameter and are sufficient in number such as that no one wire or group of wires is excessively stressed so long as resin is pumped into the bore 18 completely filling all the spaces between the individual wires and leaving no voids in the resin plug that might collapse when a larger tensile load is applied to the cable.

In some cases the present technique can also be used to terminate a cable made of other materials such as fiber glass. To accomplish this the many small individual glass fibers at the end of the cable are separated using a suitable solvent and are broomed out in much the same manner as was done with the unpreformed wire rope. With the cable fibers properly positioned in the sleeve 14 as described above, resin is pumped down into the bore 18 completely filling the spaces between the individual fibers and providing enough grab between the fibers and the plug to withstand being pulled from the plug until the plug is shifted axially within the bore. At that time compressive forces retain the fibers within the resin plug under tensile loads that are sufficient to break the cable.

The very same technique can also be used to terminate metal rods, e.g. rod rigging used in the boating industry. Here the rod is slid into the sleeve 14 and the end of the rod slit lengthwise, each length-wise strip being flared outwardly. Then the rod is pulled back into the sleeve so that the ends of the flared out strips are distributed around and engage the wall of bore 18. Thereupon epoxy resin is pumped into the bore as described above to lock the rod is place within the sleeve.

As we have seen from the forgoing, the subject termination is extremely simple in construction. It consists only of a threaded, internally-tapered sleeve, a threaded end fitting and a suitable amount of resin. The seating of the unlaid cable end in sleeve 14 automatically centers the cable within the bore 18 and distributes the cable wires uniformly around the bore. Then the threading of the fitting into bore end 18a automatically forces resin into the spaces between the individual wire segments and eliminates air bubbles in the resin body assuring proper cooperation between the cable wires, the resin plug and the sleeve. Consequently, the proper installation of the present terminal on cable can be done by unskilled personnel in the field without any special tools or other equipment.

A cable terminated in the above fashion should have a long, useful life particularly since moisture cannot accumulate in the terminal and cause possible corrosion of expansion damage to the terminal even when the terminal is used in oceanographic applications.

Figure 5:
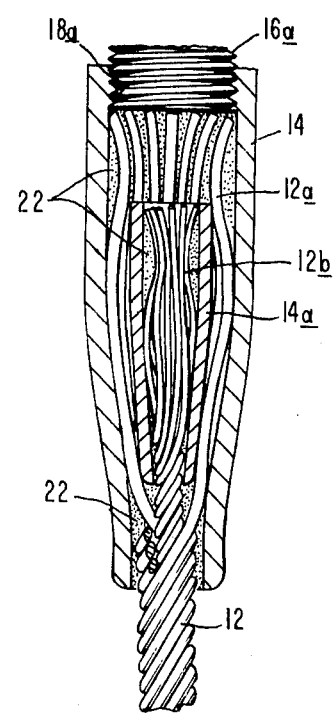
FIG. 5 is a view similar to FIG. 3 showing another embodiment of the terminal.

If the present termination technique is to be used on cables having unusually large diameters, e.g. three inches or more, it may be desirable to capture the inner group of cable wires 12b in a sleeve 14a situated within the outer group of wires 12b which are, in turn, captured by a sleeve 14. Each group of wires is unlaid so that it forms the aforesaid Coke bottle outline. An epoxy resin is poured into each sleeve 14 and 14a. When fitting extension 16a is screwed down into the threaded end 18a of the bore in sleeve 14, the resin is forced into the spaces between all of the wires 12a and 12b in both sleeves. Then when a tensile load is applied to the cable, the resin plugs in the sleeves grab the two groups of cable wires until the plugs shift axially within their respective sleeves, whereupon compressive forces take over to securely grip the wires. This tandem construction is shown in FIG. 5.

It can thus be seen that the objects set forth above among those made apparent from the preceding description are efficiently attained, and since certain changes may be made in the above construction without departing from the scope of the invention, it is intended that all matter contained in the above description or shown in the accompanying drawing be interpreted as illustrative and not in a limiting sense. For example, sleeve 14 can be externally threaded and the fitting extension 16a can be hollow with internal threads so that the fitting can be secured onto the outside of the sleeve.

It is also to be understood that the following claims are intended to cover all the generic and specific features of the invention herein described.

I claim:

1. A method of terminating a cable composed of a multiplicity of wires each preformed with a helical twist comprising the steps of
   A. gripping the cable at a selected point near as end portion thereof to be terminated,
   B. unlaying the end portion of the cable with a minimum of distortion of each unlaid wire from the laid shape so that the outermost cable wires each naturally reassumes its preformed helical twist about an axis that is different from those of the other wires whereby the wires in said portion together form an envelope that is symmetrical about the cable portion axis and has a radial bulge adjacent its inner end, a radial flare at its outer end and a radial constriction intermediate its ends,
   C. providing a sleeve with a tapered bore whose length and whose major and minor diameters are related to the envelope dimensions so that when the end portion is positioned in the sleeve with the envelope axis aligned with the bore axis
      1. the envelope bulge is positioned adjacent the smaller end of the bore,
      2. the envelope flare is positioned adjacent the larger end of the bore, and
      3. the flaring wire ends lie against and are distributed around the bore wall,
   D. arranging the cable end portion inside the sleeve bore so that the envelope axis substantially coincides with the bore axis, and
   E. filling the sleeve bore with a settable resin material so that it surrounds the unlaid wires forming a solid tapered plug extending both inside and outside the entire length of the envelope formed by those wires that will wedge against the bore wall when a tensile force is applied between the sleeve and the cable.

2. The method defined in claim 1 and including the additional steps of
   A. prior to introducing the settable material into said sleeve, untwisting the innermost cable wires of said cable end portion,
   B. enclosing said innermost wires in a second sleeve having a tapered bore, said second sleeve being contained entirely within the envelope formed by the outermost cable wires, and
   C. introducing settable resin material into the second sleeve so as to form a solid tapered plug which wedges against the interior wall of the second sleeve when a tensile force is applied between said first sleeve and the cable.

3. The method defined in claim 1 wherein the outermost wires of said cable end portion are formed into said envelope by untwisting said wires as a group approximately one-quarter turn about the cable axis.

4. Component parts for a cable termination capable of being assembled in the field at the end of a cable, said cable being composed of an outermost group of wires preformed with helical twists prior to being wound into said cable and where an end portion of said cable is unlaid with a minimum of distortion of each unlaid wire from its laid position so that the outermost wires of said end portion each naturally reassumes its preformed helical twist about an axis that is different from those of the other wires whereby the wires form an envelope having a radial bulge adjacent one end and a radial flare at the opposite end, the component parts comprising the combination of
   A. a rigid threaded sleeve having a tapered bore, the diameter of the smaller end of the bore being only slightly larger than that of the cable, the diameter of the larger end of the bore being comparable to that of the envelope flare and the length of the bore being somewhat longer than the length of the envelope, said sleeve adapted to be fitted over the end portion of the cable so that both the envelope bulge and flare are contained entirely within the tapered bore with the flaring wire ends facing the larger end of the bore and lying against the bore wall,
   B. a quantity of settable liquid resin sufficient to fill the sleeve bore adapted to be poured into the sleeve through the larger end of the bore, and
   C. a fitting threaded to mate with the threads on the sleeve, said fitting having a portion which is dimensioned to be received snugly in the larger end of the bore so that when the fitting is turned down onto the sleeve after the resin is poured but before it sets, the fitting exerts pressure on the resin so that when the resin does set it forms a substantially incompressible wedge-shaped plug substantially devoid of large air bubbles in and around the entire length of the envelope formed by the unlaid cable wires.

5. A cable termination comprising
   A. cable end portion composed of a multiplicity of helically preformed wires, the cable end portion being unlaid with a minimum distortion of each unlaid wire from its laid shape so that the outermost wires thereof each has its unique preformed helical twist about an axis that is different from those of the other wires, all of the wires in the portion forming an envelope that has a radial bulge adjacent its inner end, a radial flare at its outer end and a radial constriction intermediate its ends,
   B. a sleeve having a tapered bore receiving the cable end portion through the smaller end of the bore, said tapered bore being at least as long as the envelope, said envelope bulge being positioned adjacent the smaller end of the tapered bore and said envelope flare being positioned adjacent the larger end of the bore, and
   C. a casting of settable resin material inside the sleeve, said casting extending both inside and outside the envelope formed by the unlaid cable wires so as to form a substantially incompressible wedge-shaped plug along the entire length off the envelope which will wedge against the bore wall when a tensile force is applied between the sleeve and the cable.

6. The cable termination defined in claim 5 wherein the cable end portion also has an inner group of untwisted wires and further including A. a second sleeve having a tapered bore positioned entirely inside the envelope defined by the outermost cable wires and receiving the inner group of wires, and
B. casting of settable material inside the second sleeve and surrounding the inner group of wires which wedges against the bore wall of the second sleeve when a tensile force is applied between the cable and the first sleeve.

7. The termination defined in claim 5 wherein the envelope formed by the outermost unlaid cable wires has a shape similar to that of a Coke bottle.

8. The cable termination defined in claim 5
   A. wherein the sleeve is threaded adjacent the larger end of the bore, and
   B. further including a threaded fitting adapted to be turned down onto the sleeve so as to close said larger end of the bore.

9. A method of terminating a cable composed of a multiplicity of wires comprising the steps of
   A. gripping the cable at a selected point near an end portion thereof to be terminated,
   B. unlaying the end portion of the cable with a minimum of distortion of each unlaid wire from its laid shape so that the outermost cable wires in said portion together form an envelope that is symmetrical about the cable portion axis and has a cross-section that varies along the length of the envelope, the envelope being characterized in that it has a radial constriction intermediate its ends,
   C. providing a sleeve with a bore whose cross-section varies along its length and whose length is longer than that of the cable end portion,
   D. preparing the cable end portion and the sleeve bore for use with a settable material,
   E. arranging the cable end portion inside the sleeve bore so that the envelope axis substantially coincides with the bore axis and so that one end of the sleeve bore extends beyond the unlaid ends of said wires,
   F. filling the sleeve bore with a settable material so that it surrounds the unlaid wires forming a solid plug extending both inside and outside the envelope formed by said wires that wedges against the bore wall when a tensile force is applied between the sleeve and the cable, enough of said material being introduced into the bore so that there is an excess of said material in the portion of the bore beyond the ends of the wires, and
   G. inserting a fitting on the sleeve so that a portion thereof is forced into said one end of the sleeve bore so that the fitting portion pumps said excess material further into the bore under pressure so that any large air bubbles entrained in the settable material are forced out the opposite end of the bore and smaller air bubbles are distributed throughout the material.

* * * * *